(12) United States Patent
Schwoerer et al.

(10) Patent No.: US 8,275,052 B2
(45) Date of Patent: Sep. 25, 2012

(54) FFT CARRIER FREQUENCY OFFSET ESTIMATION FOR OFDM SIGNAL

(75) Inventors: Ludwig Schwoerer, Hattingen (DE); Andre Kaufmann, Bochum (DE)

(73) Assignee: Nokia Corporation, Espoo (FI)

( * ) Notice: Subject to any disclaimer, the term of this patent is extended or adjusted under 35 U.S.C. 154(b) by 1344 days.

(21) Appl. No.: 11/630,537

(22) PCT Filed: Jun. 28, 2004

(86) PCT No.: PCT/FI2004/000390
§ 371 (c)(1),
(2), (4) Date: Nov. 20, 2007

(87) PCT Pub. No.: WO2006/000614
PCT Pub. Date: Jan. 5, 2006

(65) Prior Publication Data
US 2009/0161771 A1    Jun. 25, 2009

(51) Int. Cl.
*H04L 27/28* (2006.01)
(52) U.S. Cl. ....................................................... 375/260
(58) Field of Classification Search .................. 375/260, 375/316, 324, 326, 327; 370/208, 210
See application file for complete search history.

(56) References Cited

U.S. PATENT DOCUMENTS

| | | | |
|---|---|---|---|
| 6,650,617 B1 * | 11/2003 | Belotserkovsky et al. | 370/210 |
| 7,039,131 B2 * | 5/2006 | Banerjea | 375/326 |
| 7,139,320 B1 * | 11/2006 | Singh et al. | 375/260 |
| 7,277,503 B2 * | 10/2007 | Huang et al. | 375/327 |
| 7,308,034 B2 * | 12/2007 | Jeon et al. | 375/260 |
| 7,310,393 B2 * | 12/2007 | Sheu et al. | 375/348 |
| 7,411,894 B2 * | 8/2008 | Ro et al. | 370/203 |
| 2003/0123383 A1 * | 7/2003 | Korobkov et al. | 370/208 |
| 2004/0228270 A1 * | 11/2004 | Chen et al. | 370/210 |

FOREIGN PATENT DOCUMENTS

| | | |
|---|---|---|
| EP | 1220505 | 7/2002 |
| GB | 2320868 | 7/1998 |
| JP | 10-285135 | 10/1998 |
| WO | WO 02098094 | 12/2002 |
| WO | WO 03028270 | 4/2003 |

OTHER PUBLICATIONS

Dong-Kyu Kim, et al; "Performance Evaluation of the Frequency Detectors for Orthogonal Frequency Division Multiplexing;" IEEE Transactions on Consumer Electronics, vol. 43, No. 3, Aug. 1997; pp. 776-783.

Yen-Ju Huang, et al; "Modified guard Band Power Detection Methods for OFDM Frequency Offset Recovery"; IEEE; 2003; pp. 2277-2281.

* cited by examiner

*Primary Examiner* — Khanh C Tran
(74) *Attorney, Agent, or Firm* — Squire Sanders (US) LLP

(57) ABSTRACT

There is being disclosed an OFDM signal receiver for detecting carrier frequency offset. When FFT transform of the signal is processed in the receiver, an estimator applies the spectrum shape of the FFT transform for estimating the carrier frequency offset.

23 Claims, 3 Drawing Sheets

FFT CARRIER FREQUENCY OFFSET ESTIMATION FOR OFDM SIGNAL

CROSS REFERENCE TO RELATED APPLICATIONS

This application is for entry into the U.S. national phase under §371 for International Application No. PCT/FI2004/000390 having an international filing date of Jun. 28, 2004, and from which priority is claimed under all applicable sections of Title 35 of the United States Code.

TECHNICAL FIELD OF THE INVENTION

The present invention concerns a receiver for receiving an OFDM signal. Furthermore, the invention concerns a mobile station, a sub-assembly, a chipset, a computer program and the use of such apparatuses for receiving an OFDM signal.

BACKGROUND ART

Multi-carrier signal radio technique such as Orthogonal Frequency Division Multiplexing (OFDM) radio technique is generally used for transmitting quite a lot of data via various frequencies. OFDM can be used in digital broadcasting systems such as DVB system. Environments and situations in the multi-carrier signal systems like broadcasting, which itself has a long history in television and radio even as a digitalised one, have clearly created a need for evaluating the multi-carrier signal technique in a situation where it was not originally designed. An example of this kind of situation can be a mobile reception. Thus, the OFDM radio technique is facing a rising mobility challenge.

An example of a problem in the RF world can be frequency offset. When receiving such a signal, the carrier center frequency may be offset from the normal channel raster. The offset may be up to 0.5 MHz. Known ways, receivers, receiver chips or devices are only capable of synchronizing into signals with a limited maximum offset. Typically, this maximum offset is about 130 kHz. Therefore, channel search has to be performed with several offsets for every channel.

Such a known synchronization and channel search/tuning can be based on the following. During channel search, the RF demodulator scans over the nominal carrier frequency with a step of about 125 kHz. Thus, with four steps ($f_c$−0.375 MHz, $f_c$−0.125 MHz, $f_c$+0.125 MHz, $f_c$+0.375 MHz) the whole possible range is covered.

This is a very time consuming known solution. In particular, every channel search for a given frequency offset can take up to some seconds. Thus, synchronisation is too much time consuming for a mobile reception.

SUMMARY OF THE INVENTION

It is therefore an object of the invention to provide a receiver, a mobile station, a sub-assembly, a chipset and a computer program product to reduce the required synchronization time.

According to the invention, the spectrum shape of the received OFDM signal, which is fast fourier transform (FFT) transformed, can be adapted to indicate the possible carrier frequency offset. Thus, there is no need for the known scanning process. Because the scanning process takes considerable amount of time, the invention achieves considerable savings in reception time. Furthermore the receiver can more directly tune into the desired frequency/channel.

A further embodiment of the invention discloses a receiver for receiving OFDM radio signal. An FFT transformation is performed for the received signal. By utilizing the existing FFT in the receiver, a rough carrier frequency offset estimation is derived, for example, with only one 2 k FFT. The spectrum shape of the OFDM signal, e.g. the position of the guard bands, is adapted and processed for determining the carrier offset.

In another further embodiment an estimator (or so-called one-shot FFT block or also alternatively referred to as one-shot branch or a carrier frequency estimator) outputs a rough frequency offset estimation, which is rather directly available. This allows a direct tuning of the RF modulator of the receiver into the acquisition range of +/−125 kHz. Therefore, no scanning is needed, which saves a considerable amount of time in the signal reception processing in the receiver.

Yet further embodiments of the invention have been specified in the dependent claims.

BRIEF DESCRIPTION OF THE DRAWINGS

The invention will now be described, by way of examples only, with reference to the accompanying drawings, in which.

DESCRIPTION OF FURTHER EMBODIMENTS

A further embodiment of the invention relates to OFDM radio signal reception and especially the channel search during start-up of the receiver. The OFDM signal and the further embodiment are applicable in DVB-T/H system (e.g. terrestrial, wireless, hand held or mobile DVB systems).

Figure 1:
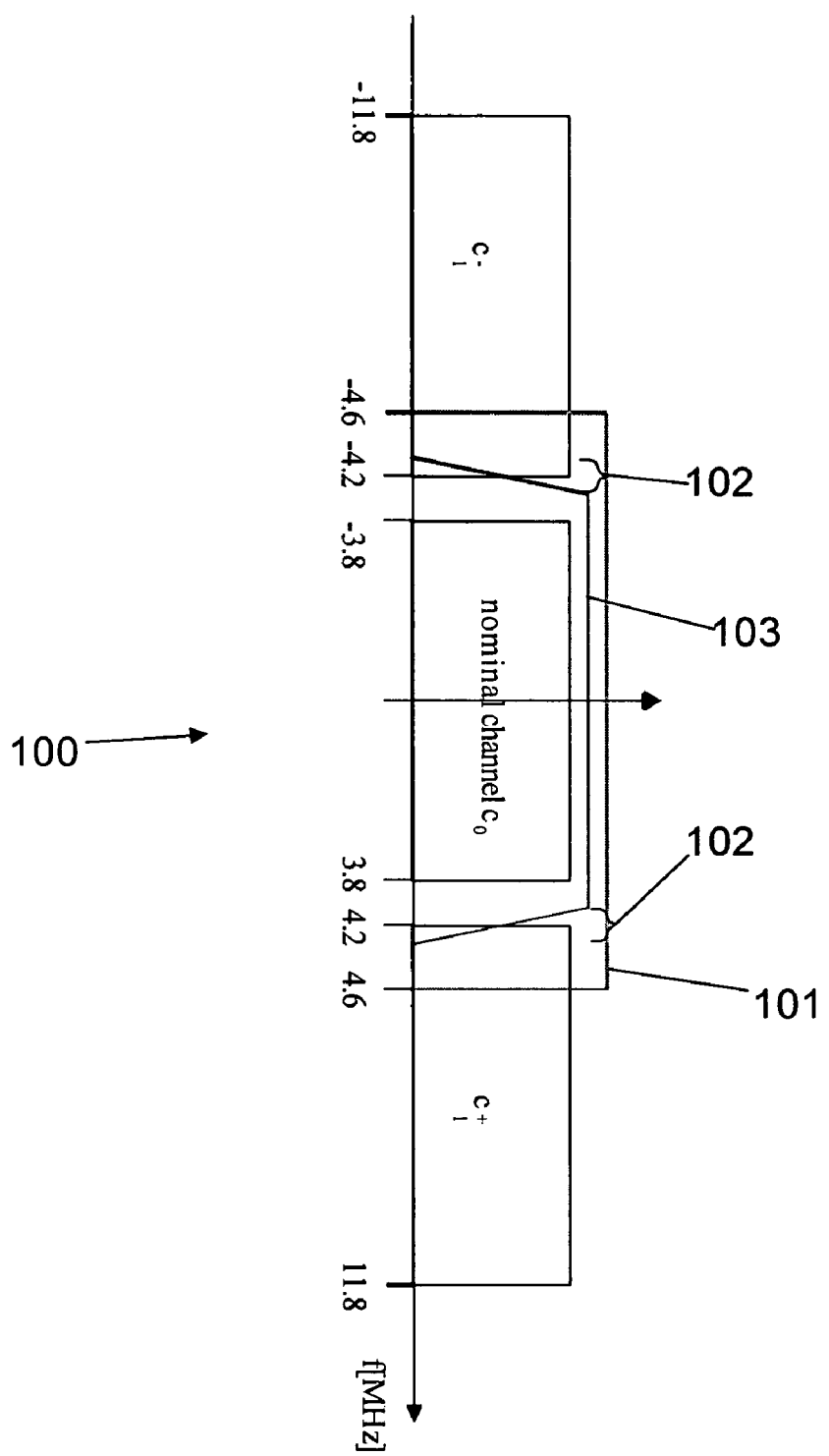
FIG. 1 depicts an exemplary spectrum scenario without a frequency offset showing guard bands of FFT signal according to some further embodiments of the invention.

As discussed briefly, FIG. 1 depicts a spectrum scenario (100) without a frequency offset showing guard bands (102) of FFT (Fast Fourier Transform) signal according to some further embodiments of the invention. An algorithm in accordance with some further embodiments is based on detecting the guard-bands (102). The guard bands (102) are clearly shown in FIG. 1. The FFT covers the full FFT range (101) from −4.6 to 4.6 MHz. Therefore it is possible to detect the guard bands (102), which are typically located from −4.2 to −3.8 MHz and 3.8 to 4.2 MHz. A spectrum shape can be prominently shown in the FIG. 1, for example in the receiver filtering (103).

Sliding Window Power Summation in Determining the Carrier Offset in Various Further Embodiments By using a sliding window power summation (SWPS) over 32 sub-carriers a power profile of the current channel can be derived:

$$SWPS_n = \sum_{m=-u}^{u-1} |f_{n+m}|^2 \text{ with } n \in N|\{u \le n \le (2048-u)\} \text{ and } u = 16.$$

N denotes all natural numbers in the formulae. In the example, the first value for n is 16, wherein the summation runs from $f_0$ to $f_{31}$. The next value for n can be 17 so that the next summation runs from $f_1$ to $f_{32}$ etc. The last one is 2032

(2048−u). Thus 2017 (SWPS)s can be calculated. It should be noted that the calculation does not need to be performed for all 2017 rounds. Accordingly, this feature is not essential for various embodiments. These shorter rounds and faster calculations are described in various another further embodiments.

Principally, a sub-carrier is assumed to belong to the guard-band (102), if its associated SWPS is below a certain percentage (p) of the overall power (P):

$$P = \sum_{m=0}^{2047} |f_m|^2.$$

However, in order to allow efficient implementation and shorter processing times the reference power ($P_{ref,n}$) is calculated based on the carriers, which are needed for calculating $SWPS_n$:

$$P_{ref,n} = \frac{\sum_{m=0}^{n} SWPS_m}{n} \text{ and}$$

$SWPS_n \in$ Guardband if $SWPS_n \leq p*P_{ref,n}$. The value of p can vary. Typically, p≈0.5.

A subsequent processing effectively filters false detections by checking that within a certain number of consecutive sub-carriers (typically 200) all sub-carriers fulfil this criterion. The lower corner of the guard band (102) is given by the first of these 200 consecutive sub-carriers.

A further embodiment of the invention can apply a one-shot FFT using a single 2 k FFT, regardless of the actual transmission mode.

Various embodiments have been described in conjunction with 2 k mode. For example, that a single 2 k FFT is used, sometimes even regardless of the actual transmission mode (2 k, 4 k, 8 k). It should be noted that in 4 k mode from the frequency point of view two carriers are combined. Furthermore, in 8 k mode respectively four carriers can be combined. Thus 4 k and 8 k modes are applicable by combining carriers. In 4 k and 8 k modes some of the carriers can be ignored, and there is being focused on the carrier coincidenting with the 2 k mode. For example, the information of any additional carriers (e.g. positions between the 2 k mode carriers) in 4 k and 8 k modes is partly collapsed into the 2 k carriers. The 2 k mode FFT is accurate enough and also the window power summation preferably uses 32 sub-carriers.

Various Offset Corrections

Further embodiments advantageously provide achieved accuracy within the range of ±130 kHz. By correcting the carrier frequency accordingly, the remaining carrier frequency offset is advantageously within the range of the post-FFT carrier frequency synchronization.

Tolerance Enabling Further Embodiments

Although the formulas in some further embodiments could indicate that the calculations should be made for all 2048 carriers, for example for the whole channel, the calculation process can be interrupted and the carrier offset estimation found. When enough results for carrier positions in the FFT have been calculated, the results can indicate that guard band (102) is found. Therefore, the carrier offset is determinable. Since the calculation of the reference power ($P_{ref,n}$) is performed in parallel with the calculation of the sliding window power summation ($SWPS_n$), both for the carriers 0 to 2047, the guard band can be detected before all values of ($P_{ref,n}$) and ($SWPS_n$) are calculated. This is possible, because not all carriers are necessary for the calculation, i.e. for ($P_{ref,n}$) and ($SWPS_n$) only carriers 0 to n are necessary.

Figure 2:
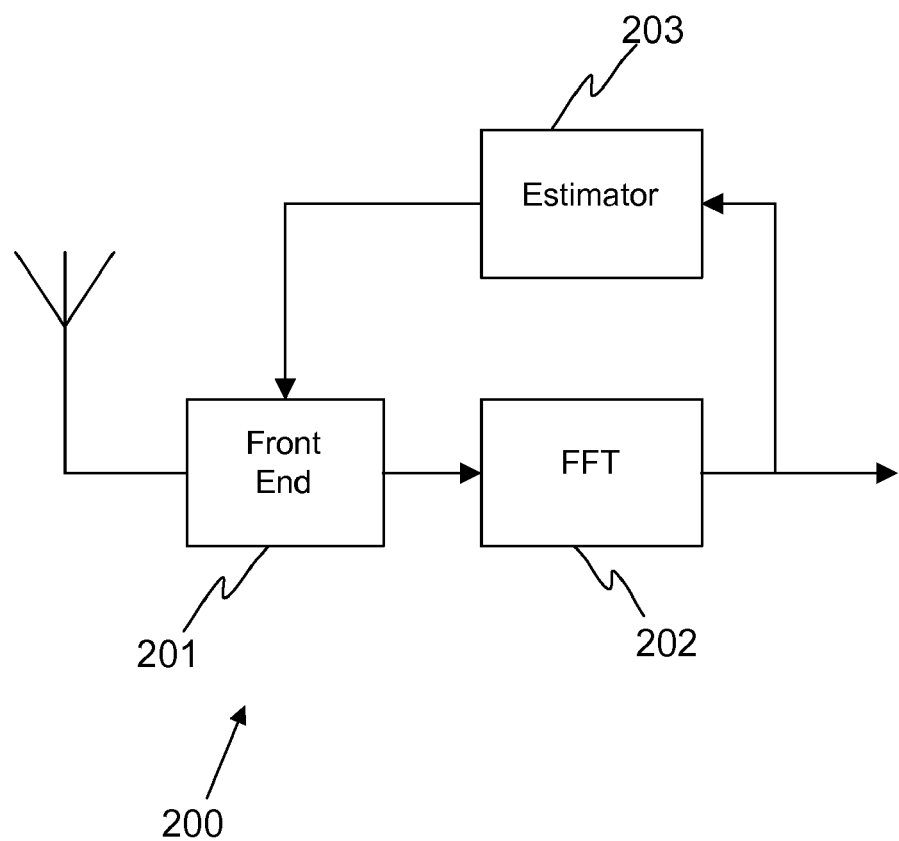
FIG. 2 depicts a simplified partial block diagram of a receiver having a one-shot FFT in accordance with another further embodiments of the invention.

Referring to the further embodiments of FIG. 2, there is being depicted a simplified partial block diagram of a receiver (200) having a one-shot FFT. The receiver (200) comprises an antenna for OFDM radio frequency signals receiving. A front end module (201) follows the antenna in the receiver (200) for starting radio frequency receiving in the receiver (200). The receiver (200) has also FFT block module (202) for performing the FFT transform for the received OFDM signals. It should be noted that the FFT block (202) is a standard block in the digital OFDM receiver. For example, normally the FFT transform is always performed for the RF signal. Therefore, it's beneficiary to apply the results of the already existing FFT transform. Furthermore, the receiver (200) comprises the so-called one-shot block (203). As discussed the one-shot block (203) can alternatively be referred to as the one-shot branch, thereby depicting the entire one-shot loop. Furthermore, the one-shot can be also referred to as an estimator for estimating the carrier offset without limiting the invention's scope to the example of FIG. 2.

Referring back to FIG. 2, the one-shot block (203) obtains the FFT of the FFT block (202). The one-shot block (203) can thereby make a rough frequency offset estimation directly. This can allow the direct tuning of the receiver into the desired frequency/channel. An output of the one-shot block (203) is the center frequency of the first channel whose falling edge (in the frequency band) is detected. Generally, the one-shot block (203) controls or is adapted to control the tuning center frequency. Based on the center frequency, the receiver can correct the carrier frequency accordingly. Thereby, the remaining carrier frequency offset can be within the range of the post-FFT carrier frequency synchronization.

One-Shot Branches in the Receiver

Generally, the one-shot block (203) or the carrier offset estimator may not be a part of the receiver's normal data path. It can be considered, for example, as an additional part of the logic, i.e. running once to determine the possible carrier frequency offset.

The Control

The one-shot block (203) or the carrier offset estimator (or the like) can be a stand-alone mode. The one-shot block (203) may be needed to be started separately, for example if the channel scenario is unknown. The software, the logic or the like etc. takes the result, tunes the center frequency of the front end (201) and starts the normal reception. I.e. that the carrier offset is compensated. The logic can have the full control over running one-shot branch or the normal reception. However, it's also possible to make the one-shot block (203) a default option in the reception. For example, that the signal is always checked by the one-shot block (203).

Figure 3:
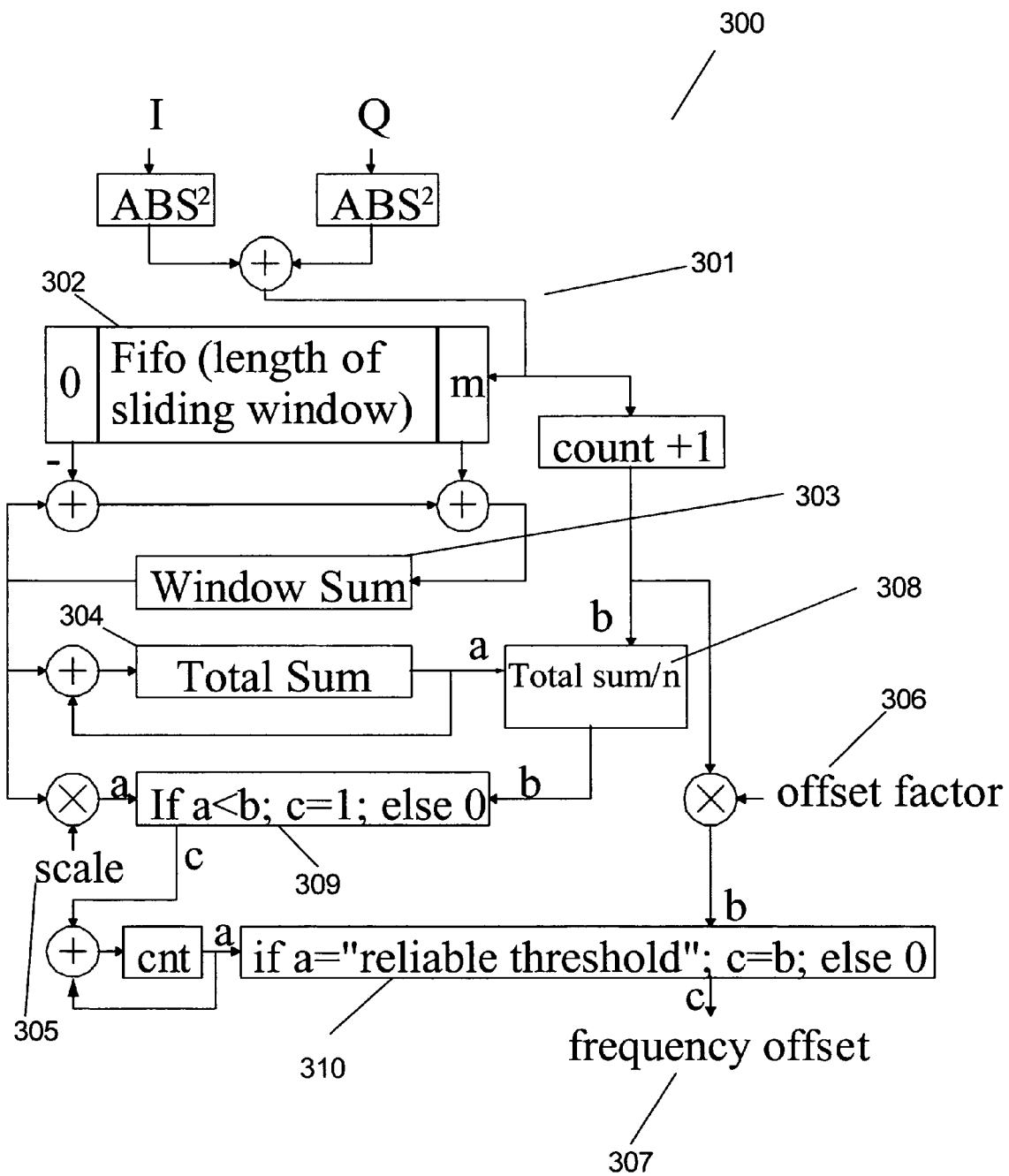
FIG. 3 depicts a functional block diagram of a one-shot block in accordance with still another further embodiments of the invention.

Referring to the FIG. 3, there is being shown a functional block diagram (300) of the one-shot block in accordance with a further embodiment of the invention. The example of FIG. 3 depicts a combined block and process diagram. The inputs to various blocks are denoted with 'a' and 'b' and the outputs of the blocks are denoted with 'c'. The processing of the FFT signal in the carrier frequency estimator begins with I and Q branches processing. There is being determined $|I|^2+|Q|^2$ values for the signal in the step (301). These values correspond in the implementation the value $|f_{n+m}|^2$ of the formula for ($SWPS_n$). The block (302) illustrates a Fifo buffer. Basically, the value for each sub-carrier is input to the Fifo one by one. Fifo can, for example, hold values for 32 sub-carriers. In step (303) the window sum is determined. Adding one, i.e. next, sub-carrier and subcontracting the 'oldest' one the window sum for each n is calculated. For example, the window sum can represent the determination of the $(SWPS_n)$ for n variable. In step (304) the total sum is determined. The total sum is derived from the window sums. For example, $P_{ref,n}$ can be an example of the total sum, which is divided by count n in step (308) giving value 'Total sum/n'=$P_{ref,n}$/n. In step (305) the window sum is scaled. The scaling factor in this example is 1/p. In step (309) the scaled window sum is compared to the 'total sum' divided by n. If the scaled window sum is less than 'Total sum/n', it indicates that the subcarrier n belongs to the guard-band. If the scaled window sum is greater, it indicates that the subcarrier n does not belong to the guardband. The number of window sums being less than 'Total sum/n' is calculated in a loop 'cnt' between steps (309) and (310) and used in step (310) as input. This accumulated count value indicates the number of subcarriers, which belong to the guardband. In step (310) finally the frequency offset is estimated. The offset factor (306) is the sub-carrier spacing. The frequency offset (307) is n times the subcarrier spacing (306). The frequency offset can be valid for the actual sub-carrier for which a reliable threshold number of the window sums scale are smaller than the total sum divided by the index of this subcarrier. The number of the sub-carrier multiplied by the offset factor can give the frequency offset with respect to the start of the FFT range.

Flexibility on Tuning Frequency

The tuning frequency can advantageously be defined by the logic. It could vary from country to country to allow a proper first initial value for the center frequency, even in the start-up phases.

Various Scenarios for Locking into the Signal

Various further embodiments describe different scenarios for locking into the signal. It should be noted that in some cases the receiver can work without the carrier offset correction ability. However, there is a clear need for such anyway, for example, if the "standard" procedure fails etc.

(A) Channel and transmission parameters are known. Therefore, no scanning is needed.

(B) Channel is known, but transmission parameters are unknown. In this embodiment, no actual scanning is needed. However, the receiver checks the different parameters until a low enough bit error rate is received.

These two modes can include a backup solution in case the channel center frequency is not met accurately enough. For example, the digital base band receiver is capable of shifting the channel in a small range (500 Hz). However, this procedure can be quite time consuming in some cases.

(C) If a new frequency band scenario is to be expected, the carrier frequency estimator or the one-shot branch can be used to detect the channel offsets. Afterwards one of the two scenarios above can be started to lock to a dedicated channel, advantageously without the need to utilize the time consuming digital shifting of the center frequency.

If the embodiments relating to (A) or (B) do not lead to a proper or desired reception, the one-shot branch or the carrier offset detection procedure may help the receiver to find out the offset. Therefore, the received signal can be corrected accordingly.

Further Implementations

Various further embodiments of the invention can be implemented in many DVB-T/H receivers. In some embodiments this can be done by an ASIC for example. E.g. a chipset for receiving OFDM signal in accordance with the further embodiments may be one or more ASIC chip. However, it should be noted that similar principles could also be used for software implementation.

Ramifications and Scope

Although the description above contains many specifics, these are merely provided to illustrate the invention and should not be construed as limitations of the invention's scope. Thus it will be apparent to those skilled in the art that various modifications and variations can be made in the apparatuses and processes of the present invention without departing from the spirit or scope of the invention.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. An apparatus comprising:
   a Fourier transform module configured to obtain a fast Fourier transform transformation of an orthogonal frequency division multiplexing signal comprising guard bands, and
   an estimator configured to estimate a carrier frequency offset for the orthogonal frequency division multiplexing signal by determining a power profile of the fast Fourier transform transformed orthogonal frequency division multiplexing signal comprising computing sliding window power sums, each over N consecutive sub-carriers, and associating a sub-carrier with the guard-band if the sliding window power sum corresponding to the sub-carrier is below a certain percentage of overall received power of the signal.

2. The apparatus according to claim 1, wherein a detectable spectrum shape of the orthogonal frequency division multiplexing signal is based on a position of one or more of the guard bands within the fast Fourier transform transformation.

3. The apparatus according to claim 1, wherein the fast Fourier transform transformation is configured to cover a range so that the estimator is configured to detect the position of the one or more guard bands in locations within the fast Fourier transform transformation configured to estimate the carrier frequency offset.

4. The apparatus according to claim 3, wherein the range is predetermined and the locations within the range are predetermined.

5. The apparatus according to claim 1, wherein the sliding window power summation is configured to be calculated based on the following formulae:

$$SWPS_n = \sum_{m=-u}^{u-1} |f_{n+m}|^2$$

with n∈N|{u≦n≦(2048−u)} and u=16, wherein $|f_m|^2$ denotes the power of the subcarrier n+m.

6. The apparatus according to claim 1, wherein the overall power of the signal is configured to be calculated based on the following formulae:

$$P = \sum_{m=0}^{2047} |f_m|^2,$$

wherein $|f_m|^2$ denotes the power of the subcarrier m.

7. The apparatus according to claim 1, wherein the estimator is further configured to determine a reference power for subsequent processing of the power profile determined orthogonal frequency division multiplexing signal for filtering false detections.

8. The apparatus according to claim 7, wherein the estimator is configured to apply the reference power instead of the overall power.

9. The apparatus according to claim 7, wherein the sub-carrier is associated with the guard bands, if the power profile is below the reference power.

10. The apparatus according to claim 9, wherein said reference power is configured to be scaled by a factor.

11. The apparatus according to claim 7, wherein the reference power is configured to be calculated based on the following formulae:

$$P_{ref,n} = \frac{\sum_{m=0}^{n} SWPS_m}{n},$$

wherein n denotes the number of subcarriers needed for calculating the sliding window power summation $SWPS_n$.

12. The apparatus according to claim 1, wherein the estimator is configured to establish a feedback loop for tuning a center frequency of the fast Fourier transform transformation based on the estimated carrier frequency offset.

13. The apparatus according to claim 1, wherein the estimator is configured to estimate the detectable carrier frequency offset with only one 2 k mode fast Fourier transform transformation.

14. The apparatus according to claim 1, wherein the estimator is configured to be started up when a channel of the orthogonal frequency division multiplexing signal is detected to have a quality, which is below a threshold.

15. A mobile station for receiving an orthogonal frequency division multiplexing signal comprising guard bands, the mobile station comprising the apparatus of claim 1.

16. A sub-assembly for receiving an orthogonal frequency division multiplexing signal comprising guard bands, the sub-assembly comprising the apparatus of claim 1.

17. A chipset for receiving an orthogonal frequency division multiplexing signal comprising guard bands, wherein the chipset comprises the apparatus of claim 1.

18. A method for receiving an orthogonal frequency division multiplexing signal comprising guard bands, the method comprising:
obtaining a fast Fourier transform transformation of an orthogonal frequency division multiplexing signal; and
estimating a carrier frequency offset for the orthogonal frequency division multiplexing signal by determining a power profile of the fast Fourier transform transformed orthogonal frequency division multiplexing signal comprising computing sliding window power sums, each over N consecutive sub-carriers, and associating a sub-carrier with the guard-band if the sliding window power sum corresponding to the sub-carrier is below a certain percentage of overall received power of the signal.

19. A data processing system comprising means for carrying out the method according to claim 18.

20. A computer program product comprising computer program code stored on a non-transitory readable medium to perform the method of claim 18 when said program code is run on a computer.

21. A non-transitory computer readable medium comprising program code adapted to carry out the method of claim 18 when run on a computer.

22. An apparatus comprising:
means for obtaining a fast Fourier transform transformation of an orthogonal frequency division multiplexing signal, and
means for estimating a carrier frequency offset for the orthogonal frequency division multiplexing signal by determining a power profile of the fast Fourier transform transformed orthogonal frequency division multiplexing signal comprising computing sliding window power sums, each over N consecutive sub-carriers, and associating a sub-carrier with the guard-band if the sliding window power sum corresponding to the sub-carrier is below a certain percentage of overall received power of the signal.

23. The apparatus according to claim 22, wherein a detectable spectrum shape of the orthogonal frequency division multiplexing signal is based on a position of one or more of the guard bands within the fast Fourier transform transformation.

\* \* \* \* \*